ALKALI METAL HYDROXIDE EVAPORATION

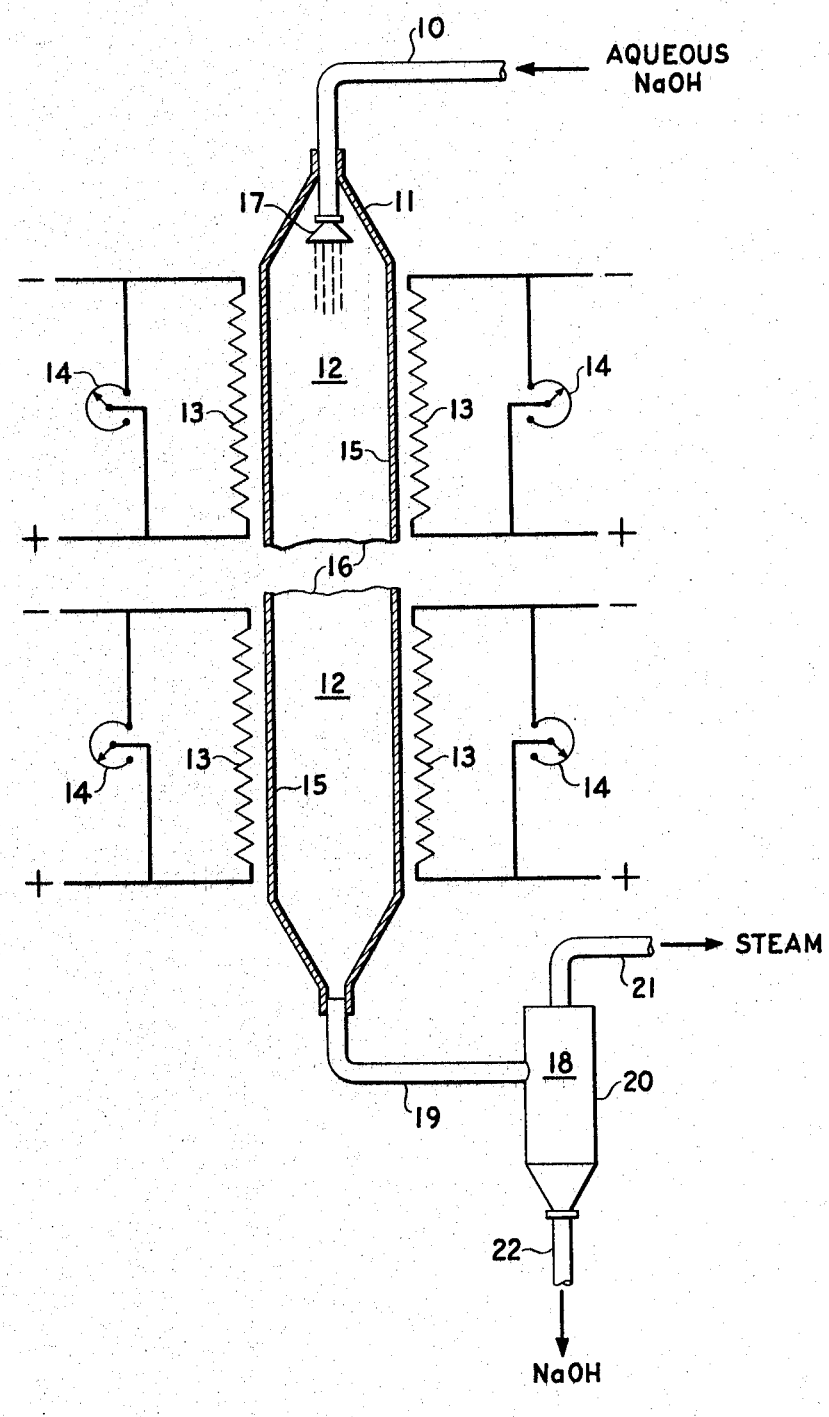

Dudley P. Fernandes, Montague, Mich., and David S. Rosenberg and Eric H. Scremin, Niagara Falls, N.Y., assignors to Hooker Chemical Corporation, Niagara Falls, N.Y., a corporation of New York
Filed Nov. 29, 1965, Ser. No. 510,223
12 Claims. (Cl. 23—302)

This invention is a continuation-in-part of a copending application S.N. 53,610 filed September 2, 1960, now abandoned, and also of S.N. 234,873 filed November 1, 1962 now abandoned.

This invention relates to a novel process for the evaporation of water from solutions of sodium hydroxide or potassium hydroxide or mixtures thereof. More particularly, this invention pertains to a process whereby finely divided droplets of alkali metal hydroxide solution are passed through a radiantly heated zone and the concentrated alkali metal hydroxide separated from the evolved steam.

The preparation of caustic potash was described by Pliny as early as the first century of the Christian era, and consisted of the digestion of wood ashes with quicklime followed by concentration of the filtrate. Production of fused caustic potash in cast iron pots was described in some detail by Albert Magnus in the thirteenth century.

The first United States patent was granted to one Samuel Hopkins of Vermont for a method of making pot and pearl ashes. In 1856, George Thomsen was granted U.S. Patent No. 15,957 for packaging solid caustic soda or potash by running the melt into thin-wall metal drums which could subsequently be stripped from the solid cake. Over the last fifty years, many patents and much literature have been published on the concentration and purification of alkali metal hydroxides.

Concentrated alkali metal hydroxides have been evaporated at atmospheric pressure by several methods. The main method is that of open "finishing" pots. A second procedure for obtaining anhydrous caustic soda is to crystallize the anhydrous solid caustic from a solution containing more than seventy-eight percent NaOH (since the solid phase is then anhydrous NaOH). A third method suggested in the art, has been to use an indirectly heated liquid medium to be directly contacted with the alkali metal hydroxide solution to be evaporated. U.S. Patent 1,668,504 proposes to use molten lead as the liquid medium, U.S. Patent 2,718,458 proposes the use of a high molecular weight paraffin, and several patents to Koleatnur show the use of kerosene and other entrainment liquids. A fourth method suggested pertains primarily to the final step of completing the dehydration of a melt containing ninety percent or more of sodium hydroxide and comprises passing it between A.C. or D.C. electrodes and providing sufficient electrical current for the heat needed to achieve final water removal. A fifth method proposed to concentrate sodium hydroxide solutions is found in U.S. Patent 1,786,516, where a sodium hydroxide solution is fed into the top of a rotating, inclined tube which is heated externally. This is a falling film type of evaporation. A sixth method for the evaporation of caustic is shown in U.S. Patent 1,883,211, wherein a solution of fifty to seventy-three percent sodium hydroxide is heated to about seven hundred and fifty degrees Fahrenheit in a closed conduit. The hot liquid follows a tortuous path before it discharges into a separator chamber in which molten caustic is separated from the steam and collected. The unit described is essentially a direct-fired, continuous pipe still. A seventh method, shown in U.S. Patent 1,899,627, is that of spray drying solutions of alkali metal hydroxide. A problem with spray drying such solutions has been in the finding of an inert carrier gas. The patent proposes the use of by-product hydrogen from electrolytic diaphragm cells, since the heat of combustion is adequate to preheat and dehydrate fifty percent caustic solution. The value of this high-purity hydrogen as a chemical intermediate generally precludes its use as a fuel. Another problem with spray drying has been that the turbulent gases at the temperature of operation have been very hard on the wall surfaces, shortening their life to an uneconomic degree.

The high temperatures needed to dehydrate alkali metal hydroxides at atmospheric pressure led investigators to consider the use of reduced pressures for this operation. The effect of pressure and concentration on the boiling point of strong caustic solutions is shown in Table I.

TABLE I

Boiling point of NaOH solutions at atmospheric and sub atmospheric pressures

| Percent Total Solids | Atmospheric Pressure, °C. | 25" Hg Absolute, °C. | 20" Hg Absolute, °C. | 15" Hg Absolute, °C. | 10" Hg Absolute, °C. |
|---|---|---|---|---|---|
| 96 | 339 | 328 | 317 | 302 | |
| 98 | 378 | 366 | 350 | 334 | |
| 99 | 414 | 402 | 384 | 366 | 339 |
| 99.2 | 425 | 413 | 395 | 376 | 349 |
| 99.4 | 440 | 427 | 410 | 390 | 361 |
| 99.6 | 463 | 449 | 430 | 407 | 378 |
| 99.8 | 504 | 484 | 463 | 439 | 406 |

Residual moisture in sodium hydroxide having concentrations below 99.6 percent solids, tends to promote sticking of flaked caustic in the drum as it cools. The preferred form of the commercial product should therefore contain less than 0.4 percent residual moisture.

It can be seen that if the minimum content of solids desired is 99.6 percent, the temperature of the boiling liquid can be lowered by fifty-six degrees centigrade at a pressure of fifteen inches of mercury absolute, and by eighty-five degrees centigrade by operation at a pressure of ten inches of mercury absolute. This reduction in boiling temperature is desirable where the caustic is being evaporated by use of a heat transfer medium such as Dowtherm, which has an operating temperature limit of about three hundred and eighty degrees centigrade.

Early investigators of vacuum evaporation of sodium hydroxide solutions discovered that as the concentration of the caustic is raised above seventy-five percent at reduced pressures an anomalous phenomenon occurs. If the pressure at which boiling takes place is reduced, a solid phase of anhydrous NaOH is obtained.

The anomaly lies in the fact that the vapor pressure of the solution in equilibrium with the solid phase increases as the concentration of sodium hydroxide increases up to a concentration of ninety-two percent sodium hydroxide. This limiting pressure is sixteen inches of mercury absolute for ninety-three percent sodium hydroxide at five hundred and thirty degrees Fahrenheit (two hundred and seventy-eight degrees centigrade). If water is evaporated from a sodium hydroxide solution at a pressure of less than sixteen inches of mercury absolute, a solid phase will appear, depending on the operating pressure selected. This anomaly is shown in Table II.

TABLE II

*Vapor pressure of saturated aqueous NaOH solutions in equilibrium with solid phase*

| NaOH Concentration, Weight Percent | Vapor Pressure, in. Hg Absolute | Temperature, °C. |
|---|---|---|
| 80 | 4 | 153 |
| 85 | 11 | 212 |
| 90 | 13.5 | 248 |
| 93 | 16.0 | 278 |
| 95 | 15 | 292 |
| 96 | 13 | 295 |
| 97 | 12 | 304 |
| 97.5 | 11.5 | 313 |
| 98 | 10.5 | 316 |
| 99 | 8.0 | 319 |
| 99.5 | 4.5 | 321 |

Once this phenomenon was known, three approaches were evolved for concentration of solutions of sodium hydroxide. One approach avoids the solid phase formation. A second approach operates within the solid phase region and the third approach operates in both regions.

In concentration of solutions of sodium or potassium hydroxide at reduced pressures in conventional equipment, numerous problems arise which have prevented widescale adoption of these procedures. Foaming of the solutions, which is troublesome at atmospheric pressure, is greatly accentuated at reduced pressures. Formation of a mist in the evolving steam is also greatly accentuated at reduced pressures. Selection of a suitable material of construction for fabrication of the heat-transfer surfaces is severely limited by the properties of both the heat-transfer medium and the caustic solutions.

The selection of a material of construction for a tubular evaporator is a major problem. Nickel or high-nickel alloys are used conventionally in evaporators for concentration of dilute caustic solutions. Attack on the nickel surfaces, particularly by decomposition of chlorates in the caustic, becomes a serious problem as the concentration and temperature of the caustic solution is increased in preparing the anhydrous form. Corrosion is particularly severe with caustic soda solution containing a seventy-five to ninety-five percent NaOH. In order to minimize this problem, it has been proposed that dehydration be effected by feeding a dilute solution of sodium hydroxide into a heel of molten caustic. This heel can be heated directly or the anhydrous melt can be reheated by circulation through a shell and tube heat exchanger of specially patented designs: see U.S. 1,054,926 to Mantius; U.S. 2,022,137 to Hanchett; U.S. 2,698,779 to Adams et al., and U.S. 2,798,543 to Cook.

Any process employing feed into a heel of anhydrous product suffers from the difficulty of providing all the heat needed at a high temperature level for the end conditions. It is also doubtful that corrosion due to the decomposition of chlorates can be avoided by this procedure.

Numerous patents have also issued showing the dehydration of caustic with a solid phase formation. This solid phase is called "beta-NaOH," and will crystallize from solution in the temperature range between ninety-four degrees centigrade and two hundred and ninety-eight degrees centigrade. In the range of two hundred and ninety-eight degrees centigrade to about three hundred and twenty-two degrees centigrade, the freezing point of anhydrous NaOH, the solid phase is "alpha-NaOH."

The anomalous vapor pressure behaviour of NaOH shown in Table II can be used to provide techniques for producing anhydrous NaOH without the necessity of attaining the high temperatures required for dehydrating the melt. Simultaneous evaporation and crystallization are proposed by George Lynn and Ralph Miller in U.S. 1,907,988. It is difficult to carry out this procedure in conventional equipment and that has prevented commercialization of this procedure. A novel solution which has been proposed is shown in U.S. 2,556,185 to Joscelyne, who proposes adiabatic vacuum dehydration of a ninety percent solution in a spray tower. The problem of preparing the ninety percent solution still remains however.

There have also been made continuous vacuum evaporators of the shell and tube design employing either falling or climbing film techniques with single pass operation. In such units it is possible for the solid beta sodium hydroxide phase to be present intermittently. However, close control of operating variables is necessary for operation under such metastable conditions.

Concentration of caustic without the use of high temperatures has been considered to be desirable. Several patents showing the use of aqueous or anhydrous ammonia to concentrate caustic have issued. Another method to concentrate and purify caustic has been by the addition of alcohols to form a solid phase.

The greatest advances in the field of caustic soda and potash technology have been in the purification procedures to be used.

One of the most objectionable impurities in caustic is chlorate, because at elevated temperatures chlorates decompose to liberate nascent oxygen which attacks nickel surfaces. Chlorates can be removed from dilute solutions by dissolving them into ammonia or amines. Another method of purification has been precipitation the caustic with the use of alcohols.

Chlorates can also be removed by their chemical destruction. U.S. 1,742,220 to Richter shows the use of alpha cellulose to effect this decomposition. Sugars are more effective for reducing chlorates than the high molecular weight carbohydrates, especially in concentrated caustic solutions (see U.S. 2,610,105). Another means of decomposing chlorates was developed by employing iron powder as shown in U.S. 2,403,798. Still another procedure used is shown in U.S. 2,735,750 to Rahn covering the use of elemental hydrogen with a catalyst to reduce chlorates in a solution of alkali metal hydroxides at a temperature of not less than one hundred and twenty-five degrees centigrade. Unfortunately, all of these methods for chlorate removal are troublesome to employ and in many cases result in additional contamination of the treated caustic.

Therefore, it is an object of this invention to concentrate dilute alkali metal hydroxide solutions, preferably to seventy percent solids content or more.

It is a further object to produce a purified alkali metal hydroxide, having a lower chlorate content than its starting material.

It is a further object to provide a continuous process for effecting the evaporation of alkali metal hydroxide solutions.

Still another object is to provide a process for handling a solid phase alkali metal hydroxide.

Still another object is to provide an evaporation process for alkali metal hydroxide solutions which does not have a foaming problem.

Still another object is to provide a high temperature process for evaporating alkali metal hydroxides which avoids corrosion caused by chlorate decomposition.

A further object is to provide an evaporation process which can be effected in relatively simple equipment.

Still another object is to provide a process which can be operated to obtain by-product high pressure steam.

A still further object is to provide an evaporation process for concentrated alkali metal hydroxide solutions which can utilize reduced pressure and lower temperatures of operation.

Still another object is to provide a concentration process for alkali metal hydroxide solutions which will produce a finely divided solid phase anhydrous alkali metal hydroxide.

Still another object is to provide an evaporation process which avoids the need of an inert carrier for the material to be evaporated.

Still another object is to provide an evaporation process in which the materials to be evaporated have a minimum amount of contact with the heated surface.

These and other related objects are accomplished by the process of our invention, which comprises: continuously introducing alkali metal hydroxide solutions in an atomized state containing between about forty percent and seventy-five percent solids into an end of an enclosed zone; conveying the atomized particles through a walled heated zone maintained at a temperature between about one hundred degrees centigrade and about eight hundred degrees centigrade by radiant heat from the walls of said zone while maintaining the zone at an absolute pressure of between about one inch of mercury and about ten atmospheres, so that steam is evolved from the atomized particles and a product of concentrated alkali metal hydroxide is formed with a minimum amount of contact with the heated surface of the said zone; separating said evolved steam from said concentrated alkali metal hydroxide product and withdrawing the alkali metal hydroxide product.

The concentration of the alkali metal hydroxide feed may be between about forty percent and seventy-five percent by weight dissolved solids, it being preferred to operate with the concentration of the alkali metal hydroxide feed being between fifty percent and seventy-three percent, with the usual concentration being about fifty percent. Operating with the concentration below forty percent is not economically practicable.

The heated zone may be radiantly heated by heating the walls of the zone with an electrical unit, a gas fired furnace, a multiplicity of gas fired units or electrical units, or both, or by passing a heated gas or liquid through a jacket, surrounding the walls of the heating zone. The radiant heat from the zone walls or boundaries maintains a high heat flux within the radiantly heated zone. It is generally desirable to maintain a heat flux in the zone from 3,000 to 15,000 B.t.u. per hour per square foot, with the usual heat flux being between 6,000 to 10,000 B.t.u. per hour per square foot and the most preferred operations being those at 5,000 to 8,000 B.t.u. per hour per square foot.

The water content of the final material depends upon commercial requirements. In the case of sodium hydroxide, the process of our invention will provide commercial grade seventy-five percent or seventy-three percent sodium hydroxide, and it will also provide substantially anhydrous sodium hydroxide. In the case of potassium hydroxide, the process of our invention will not only provide commercial grade product of eighty-five to ninety-two percent potassium hydroxide, but also may be employed to produce a product of even higher concentration.

The operating pressure of our process can be from one inch of mercury absolute to ten atmospheres. As indicated in Table I the pressure to be used is dependent upon the desired concentration of alkali metal hydroxide to be produced, and also the temperature of operation. This process provides a method for producing a finely divided solid sodium hydroxide by operating the process at a pressure below ten inches of mercury absolute and a corresponding temperature of not over three hundred degrees centigrade. At lower operating pressures, correspondingly lower temperature can be used to effect the desired concentration, thereby reducing the heat requirements and also the amount of deterioration of the walls of the zone.

If it is desired to use the evolved steam in other processes, a feature of our invention is that the process can be operated at elevated pressures, thereby enabling one to recover high pressure by-product steam in usable form.

The operating temperature of our process should be between about one hundred degrees centigrade and about eight hundred degrees centigrade. At temperatures below one hundred degrees centigrade the rate of evaporation and the absolute pressure required are so low that the process is commercially impractical, and at temperatures above eight hundred degrees centigrade, the rate of attack on the walls of the zone is so great that operation above this temperature is not feasible. When the zone is maintained at or above atmospheric pressure, the temperature should preferably be above about four hundred degrees centigrade and when it is desired to produce solid phase sodium hydroxide product of small particle size, the zone should be maintained at a pressure below ten inches of mercury absolute and at a temperature not over three hundred degrees centigrade.

When evaporating potassium hydroxide, the operating temperature should also be between about one hundred degrees centigrade and about eight hundred degrees centigrade. The feed should have a solids content of between about forty percent and about seventy-five percent. A product concentration of at least eighty-five percent KOH is obtainable. When the temperature is maintained below two hundred degrees centigrade, with the pressure maintained below eight inches of mercury absolute, a solid potassium hydroxide product of small particle size is obtained. Potassium hydroxide having a ninety to ninety-two percent solids content can be achieved by operating at about three hundred and fifty-five degrees centigrade and eighteen inches of mercury absolute pressure. Substantially anhydrous potassium hydroxide can be obtained at approximately five hundred degrees centigrade at atmospheric pressure. Also, if the absolute pressure is reduced to four inches of mercury absolute pressure, an anhydrous material can be obtained by operating at about four hundred and thirty degrees centigrade.

It is a special advantage of this invention to be able to provide an alkali metal hydroxide product which is recovered as a finely divided solid. This is done by operating at conditions such that the freezing point (or melting point) of the desired product is not exceeded. In the case of sodium hydroxide these conditions are readily calculatable from the following reference: F. E. Staniford and W. L. Badger, "Properties of Strong Caustic Soda Solutions," Ind. Eng. Chem. 46: 2400–2403 (1954).

In the case of potassium hydroxide the conditions can be obtained from the data given above, coupled with the melting point data given in Table III.

TABLE III

| Solids Content, Percent | Absolute Pressure | Melting Point, °C. |
|---|---|---|
| 100 | Atmospheric | 410 |
| 90 | Atmospheric | 220 |
| 85 | Atmospheric | [1] 100 |

[1] Eutectic.

The potassium hydroxide changes from the alpha to beta form in the range of two hundred and forty to two hundred and fifty degrees centigrade.

The diameter of the zone can be of considerable size and depends mainly upon the temperature to be used. Diameters as high as six to eight feet or more may be used.

The length of the zone depends not only upon the temperature and pressure to be used during operation, but also upon the diameter and desired retention time. We have found that the zone should be long enough to permit a retention time of from about one second to two minutes at the operating conditions desired.

We have found further that alkali metal chlorates present in the alkali metal hydroxide feed, are decomposed during the process. As long as material is maintained at an elevated temperature for a sufficient period, substantially all of the chlorates will be decomposed. Thermal decomposition of chlorates at temperatures above five hundred degrees centigrade is sufficiently rapid to be carried out during this process.

A preferred embodiment of our invention is to introduce along with the alkali metal hydroxide a small amount of reducing gas to maintain a reducing atmosphere in the zone. This helps to protect the inner wall surface of the zone and also to react with any oxygen present due to decomposition of alkali metal chlorates and dissolved oxygen. Among the reducing gases which can be used are hydrogen gas, methane, and carbon monoxide. Carbon monoxide and methane do have a slight disadvantage in that they raise the amount of carbonates in the end product. Therefore, we prefer to use hydrogen gas as a reducing means. The amount of reducing gas to be used can vary from zero to about five percent, based upon the mole percent of alkali metal hydroxide.

The alkali metal hydroxide should be in the atomized state as it passes through the heated zone. Suitable atomization can be effected by various devices, such as centrifugal pressure nozzles, pneumatic atomizers, or spinning disc atomizers, etc. A particle diameter of less than one hundred microns is desirable to provide a large surface for radiant heat transfer. The particle size should be sufficiently small so that the terminal velocity as determined by Stoke's law (for free fall of a spherical particle in a fluid medium) is very low in passage through the heated zone.

The steam acts as the medium in which the particles of alkali metal hydroxide are conveyed through the radiantly heated zone in essentially laminar or non-turbulent flow. In this way the materials pass through this zone with a minimum amount of contact with the heated surfaces of the zone walls. The retention time of the particles in the heated zone depends on the flow rate through that zone of the vapor, which consists essentially of steam.

Reference is made to the figure which is a schematic drawing illustrating the process of the invention. Aqueous alkali metal hydroxide, such as aqueous NaOH, is fed through line 10 into the top portion of a vertical elongated evaporator 11, forming a heated zone 12 therein. The aqueous solution can be preheated if desired. In the figure the evaporator is shown as being heated with electrical heating means 13, having variable temperature control means 14; however, other suitable means for maintaining an elevated temperature can be used. The heated zone 12 therefore is radiantly heated from the inside wall 15 of evaporator 11. In the figure the evaporator 11 is shown by the broken lines at 16 to be considerably longer than its diameter. The aqueous NaOH passes into atomizing means 17 where it is broken up into fine particles before being permitted to drop through the heated zone 12. An inert drying medium, such as air, is not used. As the fine particles drop through the heated zone, the radiant heat from the zone walls under the conditions maintained within the zone, cause steam to evolve from the particles, thereby concentrating them. The evolved steam and concentrated alkali metal hydroxide pass concurrently downward through the heated zone 12, and are removed at the bottom portion of the evaporator 11, heated zone 12 and passed to a separation zone 18. In the figure they are shown being removed together through line 19 and being sent to cyclone separator 20 where the steam is separated from the particles of concentrated alkali metal hydroxide and drawn off the top of the cyclone 20 through line 21, while the concentrated alkali metal hydroxide is removed at the bottom through line 22. The steam can be condensed, or its heat or work values can be utilized in other processes. The concentrated alkali metal hydroxide withdrawn through line 21 can be in the solid or liquid state depending on the conditions maintained in the evaporator 11 and cyclone 19. Although in the figure the evaporation zone 12 and the separation zone 18 have been illustrated as two separate pieces of equipment, it is to be understood that it is within the scope of this invention for the two zones to be housed within the same piece of equipment.

To further illustrate the process of our invention, the following example is given. However, we do not wish to be limited thereby, except as defined in the appended claims.

In the example given below the apparatus used was an electrically heated stainless steel cylinder, eight inches in diameter and ten feet long having a feed line terminating in a spray nozzle at the top and a withdrawal means at the bottom leading to a cyclone separator. Evolved steam was removed at the overhead of the cyclone, and concentrated product was removed at the bottom. The maximum wall temperature was limited to eight hundred degrees centigrade.

*Example*

A feed solution of commercial grade fifty percent sodium hydroxide having the following analysis was used:

NaOH, 784.8 grams per liter
$Na_2CO_3$, 11.7 grams per liter
$NaClO_3$, 0.6 gram per liter (which is 0.08 percent of the NaOH present)
NaCl, approximately 1.6 grams per liter
$Na_2SO_4$, approximately 0.04 gram per liter.

This solution was fed at room temperature with atomizing steam at thirty-five pounds per square inch gauge to a suitable nozzle mounted in the center of the top cover of the apparatus described immediately above, at a liquid feed rate of 1.1 gallons per hour, equivalent to 14.1 pounds per hour of solution, or 7.2 pounds per hour of anhydrous caustic. The retention time in the heated zone was ten seconds. The zone was radiantly heated by heating the walls with an electrical unit and maintaining the heat flux at between 5,000 and 8,000 B.t.u. per hour per square foot. The molten caustic resulting was separated from the steam produced at a temperature above five hundred degrees centigrade after solidification it was analyzed and was found to comprise: $NaOH+Na_2CO_3$ 97.5 percent, NaCl 1.9 percent, $NaClO_3$ 0.021 percent (which is about ¼ of the original $NaClO_3$ content). The recovered steam had a negligible content of NaOH. When desirable to protect the apparatus walls against corrosion and to remove any oxygen present, up to 5%, preferably .1 to 4% of reducing gas based upon the mole percent of the alkali metal hydroxide, e.g., hydrogen, carbon monoxide, methane, is added to the drying tower. Potassium hydroxide may be concentrated in the manner described above with comparable success.

It is understood that the invention is not limited to the specific example which has been offered, and that modifications may be made within the scope of the appended claims without departing from the spirit of the invention.

We claim:

1. A process for concentrating aqueous alkali metal hydroxide solutions which comprises: continuously introducing aqueous alkali metal hydroxide solution containing about forty to seventy-five percent solids by weight in an atomized state into a walled heated zone; conveying the atomized particles through said heated zone with minimum contact with the zone wall means while maintaining the temperature in said heated zone between about one hundred degrees centigrade and about eight hundred degrees centigrade by heating the said wall means of the said zone so that said wall means radiate heat into the zone to thereby maintain the said temperature, and while maintaining the pressure in said heated zone between about one inch of mercury absolute and about ten atmospheres absolute, to produce steam evolved from said atomized particles and a more concentrated alkali metal hydroxide product; passing the steam and concentrated alkali metal hydroxide product concurrently downwardly through said radiantly heated zone; passing all of said evolved steam and concentrated alkali metal hydroxide from the bottom of said zone into a separation zone; separating the steam from the more concentrated alkali metal hydroxide product and recovering the alkali metal hydroxide product so produced.

2. The process according to claim 1 wherein the said alkali metal hydroxide has metal chlorates present therein that are decomposed by heating the particles at a temperature above about three hundred degrees centigrade.

3. The process according to claim 1 wherein the temperature in the zone is maintained above about four hundred degrees centigrade while the zone is maintained at about atmospheric pressure.

4. The process of claim 1 wherein the said evolved steam is continuously separated and withdrawn at elevated pressure.

5. The process according to claim 1 wherein potassium hydroxide solution having a solids content of between forty percent and about seventy-five percent by weight is continuously atomized into the inlet of said zone and heated therein to a temperature needed at the operating pressure to obtain a potassium hydroxide product having a solids content above about eighty-five percent by weight.

6. The process according to claim 5 wherein the operating pressure is maintained below eight inches of mercury absolute and the particles are heated to a temperature of not over two hundred degrees centigrade, so that a solid potassium hydroxide product of small particle size is obtained.

7. The process according to claim 1 wherein sodium hydroxide solution having a solids content of between forty percent and about seventy-five percent by weight is continuously atomized into the inlet of said zone and heated therein to a temperature needed at the operating pressure to obtain substantially anhydrous sodium hydroxide.

8. The process according to claim 7 wherein the operating pressure is maintained below ten inches of mercury absolute and the particles are heated to a temperautre of not over three hundred degrees centigrade, so that a solid sodium hydroxide product of small particle size is obtained.

9. A process according to claim 1 wherein a small proportion of a reducing gas selected from the group consisting of hydrogen, carbon monoxide and methane is introduced into the heating zone and the temperature of the zone is maintained in the range of five hundred to eight hundred degrees centigrade at a temperature at which the reducing gas reacts with any oxygen that is present and counteracts corrosion which is causable by the presence of oxygen.

10. A process according to claim 9 wherein the reducing gas employed is hydrogen and the proportion thereof is effective to react with oxygen present and counteract corrosive action thereof, up to five percent of the alkali metal hydroxide, on a mole basis.

11. A process according to claim 1 in which the atomized alkali metal hydroxide remains in the heated zone for from 1 second to two minutes and during that time is in particulate form, being heated by radiation from the zone walls and being prevented from contacting such walls by the presence of a surrounding volume of steam formed from water driven off from the atomized particles by the heat of radiation.

12. A process according to claim 11 in which the alkali metal hydroxide is sodium hydroxide, the sodium hydroxide is dried in the heating zone, a reducing gas selected from the group consisting of hydrogen, carbon monoxide and methane is present in the heating zone in proportion up to five percent of the alkali metal hydroxide on a molar basis and the temperature in the heated zone is held at from 500 to 800 degrees centigrade, at which the reducing gas counteracts corrosive effects of any oxygen that may be present in the heated zone.

References Cited by the Examiner

UNITED STATES PATENTS

| | | | |
|---|---|---|---|
| 1,899,627 | 2/1933 | Miller | 159—48 |
| 2,556,185 | 6/1951 | Joscelyne | 159—47 |
| 2,635,684 | 4/1953 | Joscelyne | 159—48 |
| 2,735,750 | 2/1956 | Rahn | 23—184 |
| 2,873,799 | 2/1959 | Earley et al. | 159—13 X |
| 2,889,874 | 6/1959 | Gauvin | 159—48 |

FOREIGN PATENTS 507,749  11/1954  Canada.

NORMAN YUDKOFF, *Primary Examiner.*

J. SOFER, *Assistant Examiner.*